US012692951B2

(12) United States Patent
Mornacchi et al.

(10) Patent No.: US 12,692,951 B2
(45) Date of Patent: Jul. 28, 2026

(54) PRESSURE RELIEF VALVE FOR CRYOGENIC VESSEL

(71) Applicant: Microtecnica S.r.l., Turin (IT)

(72) Inventors: Andrea Mornacchi, Turin (IT); Elio Mantia, Rivalta di Turin (IT)

(73) Assignee: Microtecnica S.r.l., Turin (IT)

( * ) Notice: Subject to any disclaimer, the term of this patent is extended or adjusted under 35 U.S.C. 154(b) by 0 days.

(21) Appl. No.: 18/819,263

(22) Filed: Aug. 29, 2024

(65) Prior Publication Data

US 2025/0075812 A1     Mar. 6, 2025

(30) Foreign Application Priority Data

Aug. 29, 2023   (EP) ...................................... 23425042

(51) Int. Cl.
*F16K 15/02* (2006.01)

(52) U.S. Cl.
CPC .................................. *F16K 15/025* (2013.01)

(58) Field of Classification Search
CPC ............................... F16K 49/00; F16K 15/025
See application file for complete search history.

(56) References Cited

U.S. PATENT DOCUMENTS

| | | | | | |
|---|---|---|---|---|---|
| 4,364,411 | A | * | 12/1982 | Payton | F16K 15/026 137/513.5 |
| 4,462,421 | A | | 7/1984 | Ross et al. | |
| 5,904,178 | A | * | 5/1999 | Bracey | G05D 16/0663 137/549 |

| | | | | | |
|---|---|---|---|---|---|
| 6,637,452 | B1 | | 10/2003 | Alman | |
| 7,356,996 | B2 | | 4/2008 | Brook et al. | |
| 9,790,822 | B2 | * | 10/2017 | Tsuneishi | F01L 3/02 |
| 11,378,340 | B2 | | 7/2022 | Bunch et al. | |
| 11,644,107 | B2 | | 5/2023 | Linder et al. | |
| 2008/0110514 | A1 | | 5/2008 | Yoshida | |
| 2014/0130756 | A1 | * | 5/2014 | McAlister | F02M 25/12 123/1 A |
| 2023/0151898 | A1 | | 5/2023 | Yagiela et al. | |

FOREIGN PATENT DOCUMENTS

| | | |
|---|---|---|
| CN | 107420575 A | 12/2017 |
| CN | 111336400 A | 6/2020 |
| JP | 2013001764 A | 1/2013 |

OTHER PUBLICATIONS

Abstract for CN107420575 (A), Published: Dec. 1, 2017, 1 page.
Abstract of CN111336400 (A); Published: Jun. 26, 2020, 1 page.
Abstract of JP2013001764 (A), Published: Jan. 7, 2013, 1 page.
Can M., et al. "Porosity measurement of stainless steel filters produced by electrical discharge technique", Filtration and Separation, Elsevier Advanced Technology, Oxford, GB, vol. 41, No. 9, Nov. 1, 2004, pp. 37-40.
European Search Report for Application No. 23425042.1, mailed Feb. 21, 2024, 11 pages.

* cited by examiner

*Primary Examiner* — P. Macade Nichols
(74) *Attorney, Agent, or Firm* — Kilpatrick Townsend & Stockton LLP

(57)     ABSTRACT

A pressure relief valve for a cryogenic vessel. The pressure relief valve includes valve walls defining a fluid flow passageway through the pressure relief valve. The valve walls define a thermal conductive path between an interior of the cryogenic vessel and a surrounding environment. At least a portion of the thermal conductive path comprises a thermally insulative portion.

13 Claims, 2 Drawing Sheets

PRESSURE RELIEF VALVE FOR CRYOGENIC VESSEL

CROSS-REFERENCE TO RELATED APPLICATIONS

This application claims the benefit of European Patent Application No. 23425042.1 filed Aug. 29, 2023, the disclosure of which is incorporated herein by reference in its entirety.

FIELD OF INVENTION

This application relates to a pressure relief valve for a cryogenic vessel, a cryogenic vessel, a pipe system and an aircraft.

BACKGROUND

Alternative fuels such as Hydrogen may be important to improve sustainability in future of aviation. This means the safe and efficient storage of Hydrogen fuel on-board aircraft is a challenge faced by the industry.

It has been established that storing hydrogen in liquid form is the most efficient storage solution, mainly due to the smaller volume occupied by the fuel. This creates a number of challenges that must be addressed when designing vessels to be used for storing liquid hydrogen fuel. Firstly, the tank must minimise the heat exchange with the surrounding environment in order to limit the evaporation of the liquid hydrogen. The tank must also be pressurised to prevent cavitation, meaning controlled evaporation is required to maintain a constant pressure in the interior of the tank. Finally, the tank must comprise Hydrogen compatible materials, which are capable of maintaining their mechanical properties under cryogenic conditions.

SUMMARY

According to a first aspect, there is provided a pressure relief valve for a cryogenic vessel. The pressure relief valve comprises valve walls defining a fluid flow passageway through the pressure relief valve, wherein the valve walls define a thermal conductive path between an interior of the cryogenic vessel and a surrounding environment, wherein at least a portion of the thermal conductive path comprises a thermally insulative portion.

By including a thermally insulative portion in the thermal conductive path, the heat transfer between the surrounding environment and interior of the cryogenic vessel is reduced, meaning the low temperature inside the cryogenic vessel can be more easily maintained.

The thermally insulative portion may comprise a non-metallic material.

The thermally insulative portion may comprise a plastic.

The thermally insulative portion may comprise a thermoplastic.

The thermally insulative portion may comprise Polyether ether ketone (PEEK).

The use of PEEK may be beneficial due to its low thermal conductivity and low permeability, ensuring the interior conditions of the cryogenic vessel can be maintained and the hydrogen fuel can be stored within it securely.

The thermally insulative portion may comprise a composite material formed of PEEK fibres held together by resin.

The thermally insulative portion may alternatively comprise other plastics or thermoplastics.

The pressure relief valve may comprise a filter, the filter configured to prevent material from passing through the pressure relief valve from the interior of the cryogenic vessel.

The filter may be formed of Inconel.

The use of Inconel may be beneficial as it maintains its material properties under the temperature conditions required for the use of hydrogen fuel, and Inconel is also not subject to hydrogen embrittlement.

The filter may alternatively comprise other metallic materials suitable for use with hydrogen fuel.

The pressure relief valve may comprise a spool, the spool configured to move into an open position when the pressure within the interior of the cryogenic chamber is greater than a threshold pressure, such that the pressure relief valve is open whilst the spool is in the open position.

The spool may be formed of Inconel.

The use of Inconel (or other stiffer (e.g. metallic) material than the valve walls) for the spool in combination with the use of PEEK (or other more flexible (e.g. plastic) material than the spool) for the valve walls may allow the creation of a seal between the valve walls and spool when the spool is in a closed position and the pressure relief valve is closed without needing a separate seal component.

The spool may alternatively comprise other metallic materials suitable for use with hydrogen fuel.

The thermally insulative portion may completely surround the spool.

The thermally insulative portion may extend between mechanical interfaces of the pressure relief valve, wherein the mechanical interfaces connect the pressure relief valve to the surrounding environment and the interior of the cryogenic vessel.

The mechanical interfaces may be formed of Inconel.

The use of Inconel for the mechanical interfaces may improve the resistance of the pressure relief valve to the high vibration level typical of aeronautical applications The cryogenic vessel may be configured to store hydrogen fuel.

The thermal conductive path may be the only path in the pressure relief valve along which heat may travel between the interior of the cryogenic vessel and the surrounding environment.

According to a second aspect, there is provided a cryogenic vessel comprising the pressure relief valve of the first aspect.

The cryogenic vessel may comprise hydrogen fuel.

According to a third aspect, there is provided a pipe system comprising the pressure relief valve of the first aspect.

According to a fourth aspect, there is provided an aircraft comprising the cryogenic vessel of the second or third aspect.

BRIEF DESCRIPTION OF DRAWINGS

Various examples will now be described with reference to the accompanying drawings in which.

DETAILED DESCRIPTION

Figure 1:
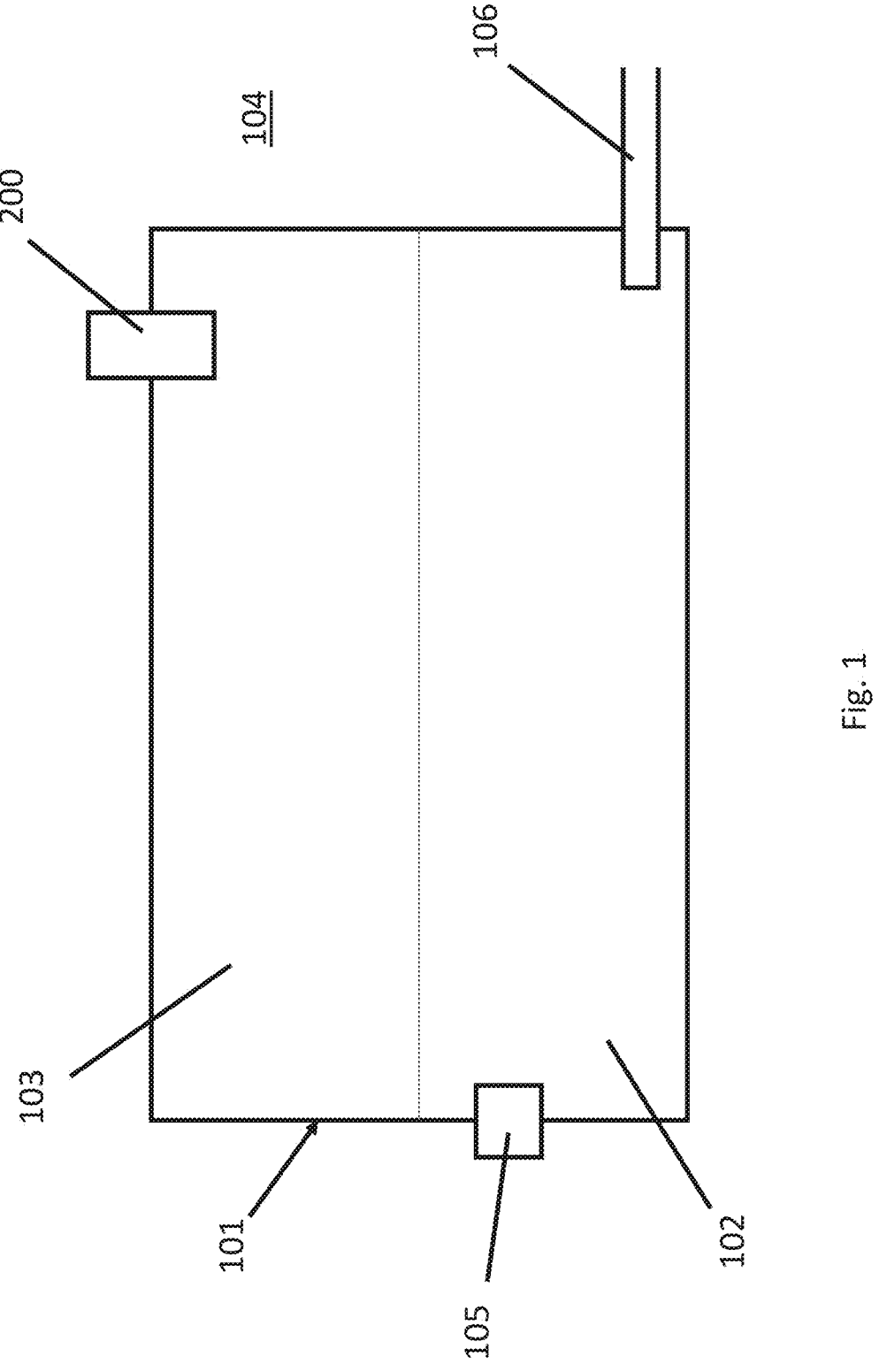
FIG. 1 shows a cross section of a cryogenic vessel comprising hydrogen fuel and a pressure relief valve.

With reference to FIG. 1, a cryogenic vessel 101 comprises liquid hydrogen fuel 102, gaseous hydrogen 103, a vessel pressuriser 105, a fuel outlet 106 and a pressure relief valve 200.

The liquid hydrogen fuel 102 and gaseous hydrogen 103 are contained inside the cryogenic vessel 101. The cryogenic vessel 101 is configured to store the liquid hydrogen fuel 102.

The cryogenic vessel 101 is comprised in an aircraft not shown in the figure.

The fuel outlet 106 is positioned in a wall of the cryogenic vessel 101, such that it is in direct fluid communication with the liquid hydrogen fuel 102. The fuel outlet 106 is configured to supply liquid hydrogen fuel 102 from the cryogenic vessel 101 to the aircraft (e.g. to an aircraft engine during use).

The vessel pressuriser 105 is positioned in a wall of the cryogenic vessel 101, such that it is in direct fluid communication with the liquid hydrogen fuel 102. The vessel pressuriser 105 is configured to cause boiling of liquid hydrogen fuel 102 to form gaseous hydrogen 103, thereby increasing the pressure in the cryogenic vessel 101, for example, by using an electrical resistance to cause the boiling of liquid hydrogen fuel 102

The pressure relief valve 200 is positioned in a wall of the cryogenic vessel 101, such that the pressure relief valve 200 can selectively provide a fluid flow path between an interior of the cryogenic vessel 101 and a surrounding environment 104. The pressure relief valve 200 is positioned such that it is in direct fluid communication with the gaseous hydrogen 103.

During use, the walls of the cryogenic vessel 101 insulate the interior of the cryogenic vessel 101 from the external environment 104, in order to maintain an isolated temperature and pressure as required. The vessel pressuriser 105 causes the boiling of the liquid hydrogen fuel 102. This increases the pressure in the interior of the cryogenic vessel 101 as required, in order to prevent cavitation. As described below, the pressure relief valve 200 selectively opens to release gaseous hydrogen 103 into the surrounding environment 104. This decreases the pressure in the interior of the cryogenic vessel 101 as required, in order to avoid overpressure. As described below, the pressure relief valve 200 thermally insulates the interior of the cryogenic vessel 101 from the surrounding environment 104.

The pressure relief valve 200 may alternatively be positioned in the wall of a pipe system, not shown in the figures.

Figure 2:
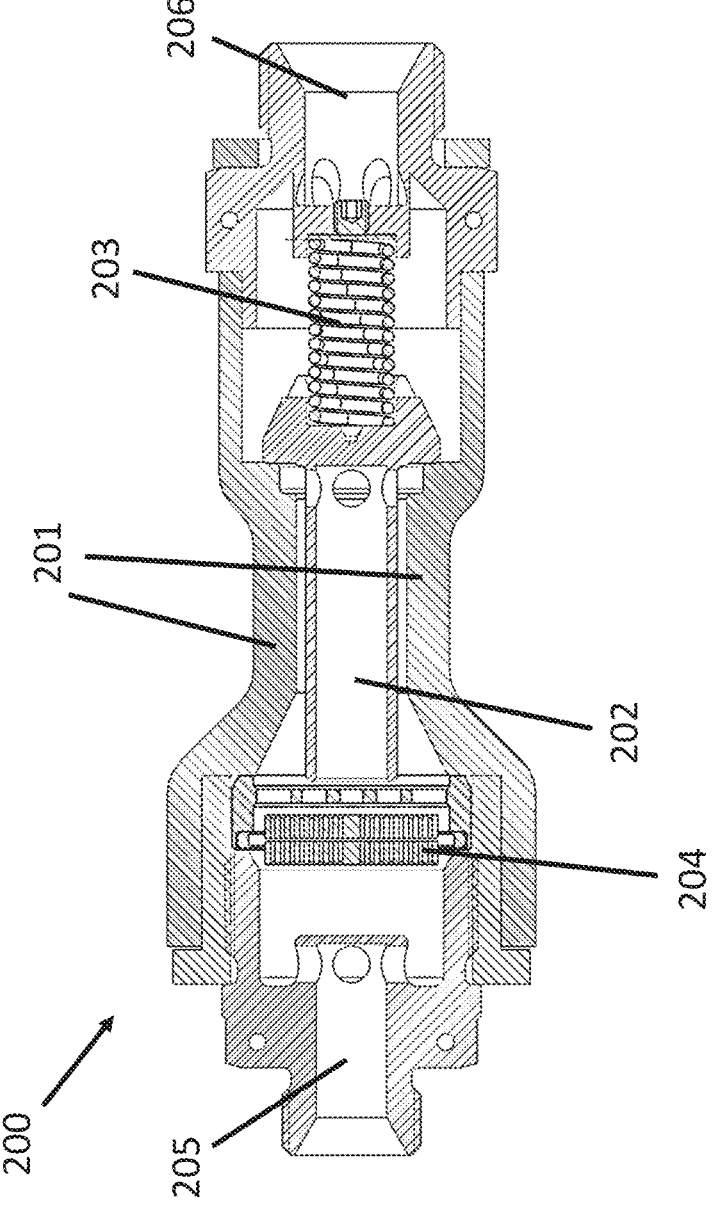
FIG. 2 shows a cross section of a pressure relief valve.

With reference to FIG. 2, the pressure relief valve 200 comprises valve walls 201, a spool 202, a biasing element 203, a filter 204, a first mechanical interface 205 and a second mechanical interface 206. The biasing element 203 is in this example a spring 203.

The valve walls 201 form part of an outer surface of the pressure relief valve 200, and extend between the first mechanical interface 205 and the second mechanical interface 206. The valve walls 201 define a fluid flow passageway inside the valve walls 201. The fluid flow passageway extends through the pressure relief valve 200 from the first mechanical interface 205 to the second mechanical interface 206. The valve walls 201 comprise an internal surface, wherein the internal surface comprises a stepped portion, such that fluid flow passageway extends in a lateral direction at a point along the pressure relief valve 200.

The first and second mechanical interfaces connect the pressure relief valve 200 to other components to provide fluid communication between the fluid flow passageway and the other components. When in use with the cryogenic vessel 101, the first mechanical interface 205 is in fluid communication with the gaseous hydrogen 103 in the interior of the cryogenic vessel 101, and the second mechanical interface 206 is in fluid communication with the surrounding environment 104. The mechanical interfaces 205 206 are formed of Inconel.

The valve walls 201 define a thermal conductive path between the interior of the cryogenic vessel 101 and the surrounding environment 104. The thermal conductive path is the only path in the pressure relief valve 200 along which heat may travel by thermal conduction between the interior of the cryogenic vessel 101 and the surrounding environment 104. At least a portion of the thermal conductive path comprises a thermally insulative portion.

In the present example, the thermally insulative portion extends between mechanical interfaces 205 206 of the pressure relief valve 200.

In the present example, the thermally insulative portion forms the entirety of the valve walls 201.

The thermally insulative portion comprises a non-metallic material. In the present example, the valve walls 201 comprise a composite material formed of PEEK fibres held together by resin.

The use of a thermally insulative portion means that the thermal bridge created by the pressure relief valve 200 between the interior of the cryogenic vessel 101 and the surrounding environment 104 is interrupted. This means heat cannot travel from the surrounding environment 104 to the interior of the cryogenic vessel 101 by conduction, which would otherwise result in increased evaporation of the liquid hydrogen fuel 102.

The spool 202 comprises a substantially cylindrical body and a flange at one end of the spool 202, wherein the flange extends from the cylindrical body in a lateral direction and has a circumference greater than the rest of the body. The spool 202 is formed of Inconel.

A first end of the biasing element 203 is fixed to the spool 202, and a second end of the biasing element 203 is fixed to the second mechanical interface 206. The spool 202 is positioned between the valve walls 201, such that it is free to move along an axis parallel to the fluid flow passageway. The thermally insulative portion completely surrounds the spool 202.

The spool 202 and biasing element 203 are configured such that the spool 202 remains in a closed position when the pressure of the interior of the cryogenic vessel 101 is below a threshold pressure. In the closed position, a face of the flange of the spool 202 perpendicular to the fluid flow passageway presses against the valve walls 201, more specifically, against the stepped portion of the valve walls 201. This occurs as compression of the biasing element 203 results in a force applied to the spool 202 in a direction towards the interior of the cryogenic vessel 101. This creates a seal between the Inconel spool 202 and composite material valve walls 201, meaning the fluid flow passageway is blocked. In this state, the pressure relief valve 200 is closed.

If the pressure of the interior of the cryogenic vessel 101 is greater than a threshold pressure, the spool 202 is configured to move into an open position. When above the threshold pressure, pressure from the interior of the cryogenic vessel 101 results in a force applied to the spool 202 in a direction away from the interior of the cryogenic vessel 101 that is greater than the force from the biasing element 203 in the direction towards the interior of the cryogenic vessel 101. This means the spool 202 moves away from the interior of the cryogenic vessel 101, and a gap is opened between the spool 202 and valve walls 201, meaning the fluid flow passageway is unblocked. This allows gaseous hydrogen 103 to escape the cryogenic vessel 101 via the fluid flow passageway. In this state, the pressure relief valve 200 is open.

As gaseous hydrogen 103 escapes the cryogenic vessel 101, the interior pressure of the cryogenic vessel 101 will decrease. When the interior pressure of the cryogenic valve 101 returns to a value below the threshold pressure, the spool 202 will return to the closed position and the pressure relief valve 200 closes.

The filter 204 is attached to the first mechanical interface 205, such that the fluid flow passageway passes through it. The filter 204 is formed of Inconel.

The filter 204 is configured to prevent impurities and debris passing through the pressure relief valve 200 from the interior of cryogenic vessel 101 via the fluid flow passageway. The filter 204 is positioned between the cryogenic vessel 101 and the spool 201, more specifically, between the cryogenic vessel 101 and the portion of the spool 202 which contacts the valve walls 201 to close the pressure relief valve 200. This reduces the risk of debris settling in a section of the fluid flow passageway between the spool 202 and valve walls 201, which could mean the spool 202 cannot return to the closed position and the seal between the spool 202 and valve walls 201 is not formed. If the seal is not formed, leakage of gaseous hydrogen 103 to the surrounding environment 104 may occur.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A pressure relief valve for a cryogenic vessel, the pressure relief valve comprising:
    valve walls defining a fluid flow passageway through the pressure relief valve;
    an internal surface comprising a stepped portion, such that fluid flow passageway extends in a lateral direction at a point along the pressure relief valve;
    wherein the valve walls define a thermal conductive path between an interior of the cryogenic vessel and a surrounding environment;
    wherein at least a portion of the thermal conductive path comprises a thermally insulative portion; and
    a spool configured to move into an open position when the pressure within the interior of the cryogenic vessel is greater than a threshold pressure, such that the pressure relief valve is open whilst the spool is in the open position;
    wherein the thermally insulative portion surrounds the spool;
    wherein the spool comprises a substantially cylindrical body and a flange at one end of the spool, wherein the flange extends from the cylindrical body in a lateral direction and has a circumference greater than the rest of the body;
    wherein, in the closed position, a face of the flange of the spool perpendicular to the fluid flow passageway presses against the stepped portion of the valve walls.

2. The pressure relief valve of claim 1, wherein the thermally insulative portion comprises a non-metallic material.

3. The pressure relief valve of claim 1, wherein the thermally insulative portion comprises Polyether ether ketone (PEEK).

4. The pressure relief valve of claim 1, wherein the thermally insulative portion comprises a composite material formed of PEEK fibres held together by resin.

5. The pressure relief valve of claim 1, wherein the pressure relief valve further comprises:
    a filter configured to prevent material from passing through the pressure relief valve from the interior of the cryogenic vessel.

6. The pressure relief valve of claim 5, wherein the filter is formed of Inconel.

7. The pressure relief valve of claim 1, wherein the spool is formed of Inconel.

8. The pressure relief valve of claim 1, wherein the thermally insulative portion extends between mechanical interfaces of the pressure relief valve.

9. The pressure relief valve of claim 1, wherein the thermal conductive path is the only path in the pressure relief valve along which heat may travel by conduction between the interior of the cryogenic vessel and the surrounding environment.

10. A cryogenic vessel comprising:
    hydrogen fuel stored in the cryogenic vessel;
    a pressure relief valve comprising:
        valve walls defining a fluid flow passageway through the pressure relief valve;
        wherein the valve walls define a thermal conductive path between an interior of the cryogenic vessel and a surrounding environment;
        wherein at least a portion of the thermal conductive path comprises a thermally insulative portion.

11. The cryogenic vessel of claim 10, wherein the pressure relief valve further includes:
    an internal surface comprising a stepped portion, such that fluid flow passageway extends in a lateral direction at a point along the pressure relief valve; and
    a spool configured to move into an open position when the pressure within the interior of the cryogenic vessel is greater than a threshold pressure, such that the pressure relief valve is open whilst the spool is in the open position;
    wherein the thermally insulative portion surrounds the spool;
    wherein the spool comprises a substantially cylindrical body and a flange at one end of the spool, wherein the flange extends from the cylindrical body in a lateral direction and has a circumference greater than the rest of the body;
    wherein, in the closed position, a face of the flange of the spool perpendicular to the fluid flow passageway presses against the stepped portion of the valve walls.

12. An aircraft comprising:
    a cryogenic vessel as recited in claim 11.

13. A pipe system comprising:
    a pressure relief valve as recited in claim 1.

* * * * *